United States Patent [19]

Orii

[11] Patent Number: 4,523,889

[45] Date of Patent: Jun. 18, 1985

[54] APPARATUS FOR AUTOMATICALLY DELIVERING WORKPIECE

[75] Inventor: Masaru Orii, Machida, Japan

[73] Assignee: Kabushiki Kaisha Orii Jidoki Seisakusho, Japan

[21] Appl. No.: 370,570

[22] Filed: Apr. 21, 1982

[30] Foreign Application Priority Data

Feb. 16, 1982 [JP] Japan .................................. 57-023377

[51] Int. Cl.³ .............................................. F16H 25/12
[52] U.S. Cl. ...................................... 414/752; 74/53;
74/522; 901/12
[58] Field of Search ...................... 414/735, 749, 752;
74/522, 828, 834, 53; 901/12

[56] References Cited

U.S. PATENT DOCUMENTS

| | | | |
|---|---|---|---|
| 3,751,996 | 8/1973 | Beezer | 74/53 |
| 3,881,362 | 5/1975 | Beezer | 414/749 X |
| 4,044,619 | 8/1977 | Koch et al. | 74/53 |
| 4,289,040 | 9/1981 | Haluko, Jr. | 414/749 X |
| 4,361,413 | 11/1982 | Toda | 414/749 |

Primary Examiner—Robert J. Spar
Assistant Examiner—Donald W. Underwood
Attorney, Agent, or Firm—Kane, Dalsimer, Kane, Sullivan and Kurucz

[57] ABSTRACT

An automatic workpiece delivery apparatus includes a support member mounted on a body for vertical movement. A slide bar is supported by the support member for horizontal movement and has a pair of workpiece holders at its opposite ends. First and second cams are mounted on a common cam shaft. First and second cam mechanisms are operable respectively in response to the cam surfaces of the first and second cams. A first displacement transmitting mechanism operatively connects the first cam mechanism to the slide bar for displacing the slide bar horizontally. A second displacement transmitting mechanism operatively connects the second cam mechanism to the support member for displacing the support member vertically. A motor has an output shaft connected to the cam shaft for rotating the first and second cams. The cam surfaces of the first and second cams have such configurations that upon one revolution of the cam shaft, the slide bar and the support member are moved horizontally and vertically, respectively, in a sequential manner, thereby moving the workpiece in a predetermined manner.

3 Claims, 5 Drawing Figures

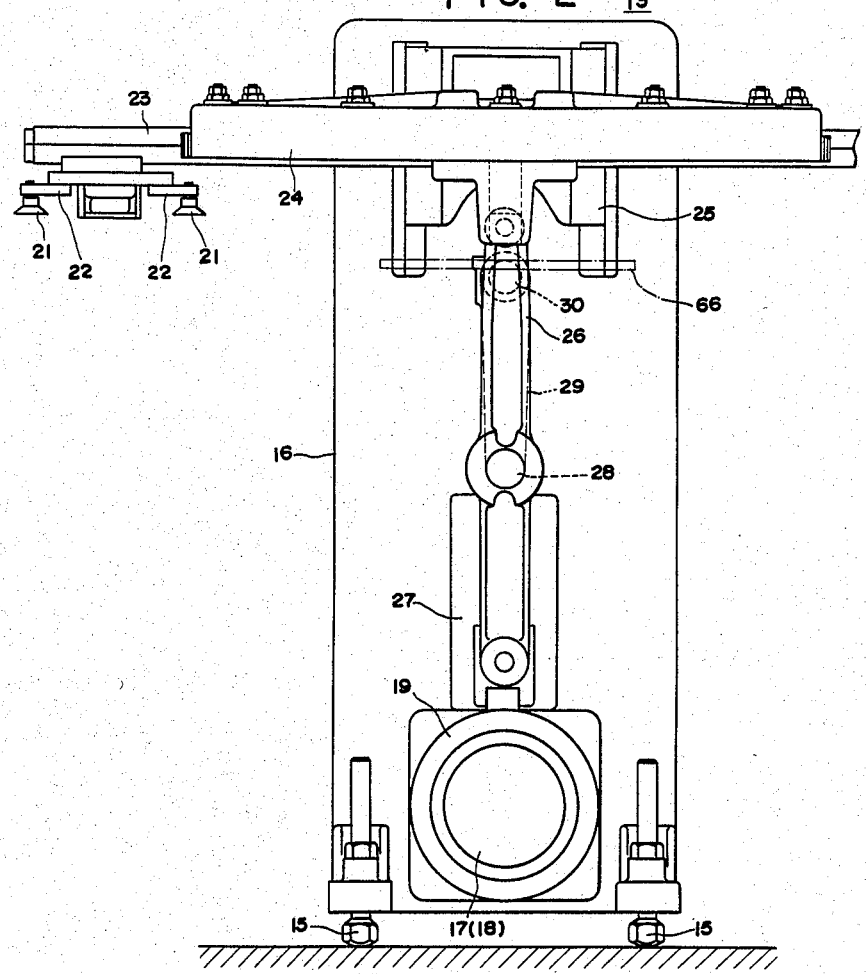

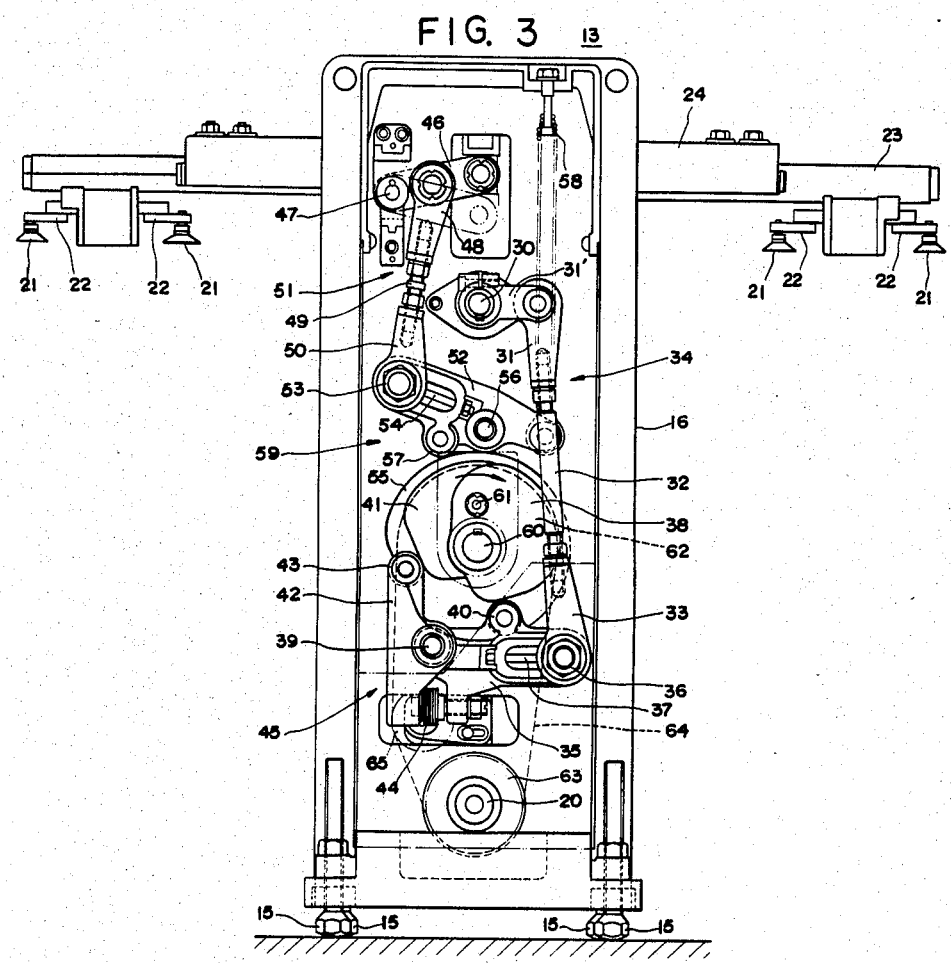

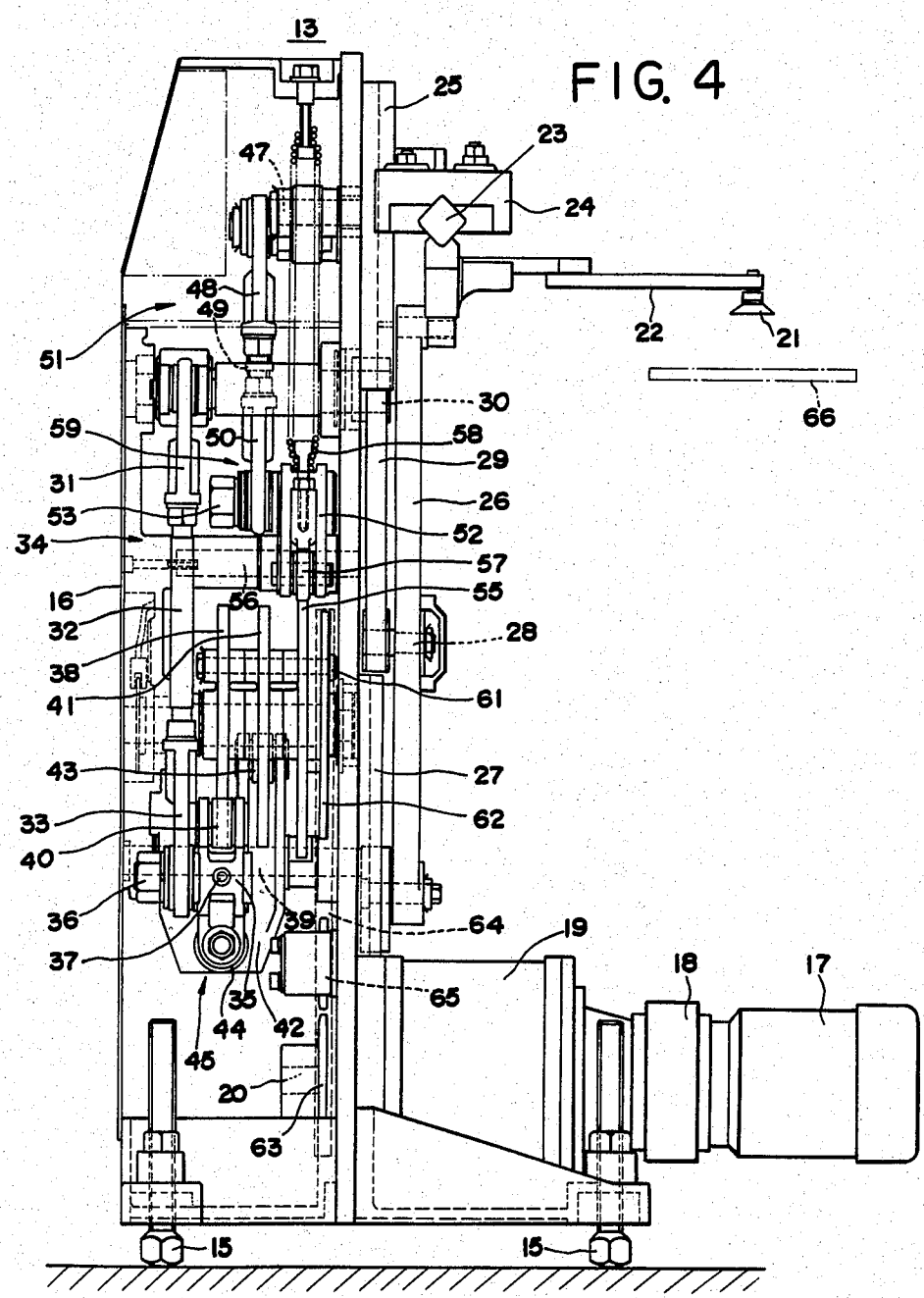

APPARATUS FOR AUTOMATICALLY DELIVERING WORKPIECE

BACKGROUND OF THE INVENTION

1. Field of the Invention

This invention relates to an apparatus for automatically delivering a workpiece and particularly to such an apparatus of the type in which a holder means for holding the workpiece is moved both horizontally and vertically through a single motor.

2. Prior Art

In the case where a workpiece is subjected to pressing operations at several stages to have a final shape, it is desirable from viewpoints of operator safety and operating efficiency that the workpiece is automatically delivered from one press to another by an automatic delivery apparatus. Most conventional delivery apparatuses have employed at least two different kinds of drive means such as a motor, a pneumatic actuator for moving a workpiece holder both horizontally and vertically. As a result, such conventional automatic delivery apparatuses are quite bulky. In addition, in order to carry out the horizontal and vertical movements of the workpiece holder in a smooth and continuous manner, such conventional delivery apparatuses have required a plurality of sensing means such as a limit switch for sensing the limit positions of the horizontal and vertical movements. Therefore, the conventional delivery apparatuses have frequently operated improperly because of such a complicated sensing arrangement.

Further, each time the strokes of the horizontal and vertical movements of the workpiece holder is to be valid, the positions of the plurality of sensing means must be adjusted. This requires much time.

Another conventional automatic workpiece delivery apparatus employs two pneumatic cylinders for carrying out the horizontal and vertical movements of the workpiece holder, respectively. This conventional delivery apparatus is also disadvantageous in that the switching of the horizontal to vertical movements, and vice versa is rather difficult to be carried out, so that many expensive control parts are required to effect the horizontal and vertical movements in a smooth and continuous manner.

A further known automatic delivery apparatus employs a single motor for carrying out the horizontal and vertical movements of the workpiece holder. Two clutch mechanisms are provided in a power transmission line of the motor for controlling the horizontal and vertical movements of the workpiece holder. Thus, this conventional delivery apparatus is complicated in construction and therefore susceptible to malfunction.

SUMMARY OF THE INVENTION

It is therefore a general object of this invention to provide an automatic workpiece delivery apparatus which overcomes the above deficiencies of the prior art.

Another object is to provide such a delivery apparatus which is compact in construction and can effect the horizontal and vertical movements of a workpiece holder in a predetermined sequence, using a single motor as a drive means and two cams mounted on a common cam shaft for controlling the horizontal and vertical movements of the workpiece holder. The delivery apparatus is capable of automatically delivering a workpiece at a high speed in a stable manner and is capable of switching the horizontal to vertical movements of the workpiece holder and vice versa without the need for a sensing means such as a limit switch.

A further object is to provide such a delivery apparatus in which an extensible rod is provided in a displacement transmitting mechanism for transmitting the displacement of a cam, so that the rod is moved toward and away from a cam lever shaft by a set screw to accurately adjust the amounts of the horizontal and vertical movements of the workpiece holder in a simple manner.

A still further object is to provide such a delivery apparatus in which a cam means for controlling the horizontal movement of the workpiece holder comprises two cams having cooperative cam surfaces in order to actuate the cam mechanism in a stable manner in response to the displacement of the cam surface.

A still further object is to provide such a delivery apparatus in which the cam mechanism for controlling the horizontal movement of the workpiece hold and the cam mechanism for controlling the vertical movement is positioned in opposed relation with the cam shaft being interposed therebetween, thereby making use of the space in the delivery apparatus effectively.

According to the present invention, there is provided an apparatus for automatically delivering a workpiece which comprises a body; a horizontally-disposed support member mounted on the body for vertical movement; a horizontally-disposed slide bar supported by the support member for horizontal movement therealong, the slide bar having a pair of workpiece holders at its opposite ends; first and second cams mounted on a common cam shaft and having their respective cam surfaces; first and second cam mechanisms operable respectively in response to the cam surfaces of the first and second cams; a first displacement transmitting mechanism operatively connecting the first cam mechanism to the slide bar for displacing the slide bar horizontally; a second displacement transmitting mechanism operatively connecting the second cam mechanism to the support member for displacing the support member vertically; and a motor having an output shaft connected to the cam shaft for rotating the first and second cams; the cam surfaces of the first and second cams having such configurations that upon one revolution of the cam shaft, the slide bar and the support member are moved horizontally and vertically, respectively, in a sequential manner, thereby moving the workpiece in a predetermined manner.

BRIEF DESCRIPTION OF THE DRAWINGS

FIG. 2 is a front elevational view of the delivery apparatus;

FIG. 3 is a rear elevational view of the delivery apparatus with part of the body omitted;

FIG. 4 is a side elevational view of the delivery apparatus with part of the body omitted.

DESCRIPTION OF THE PREFERRED EMBODIMENT

Figure 1:
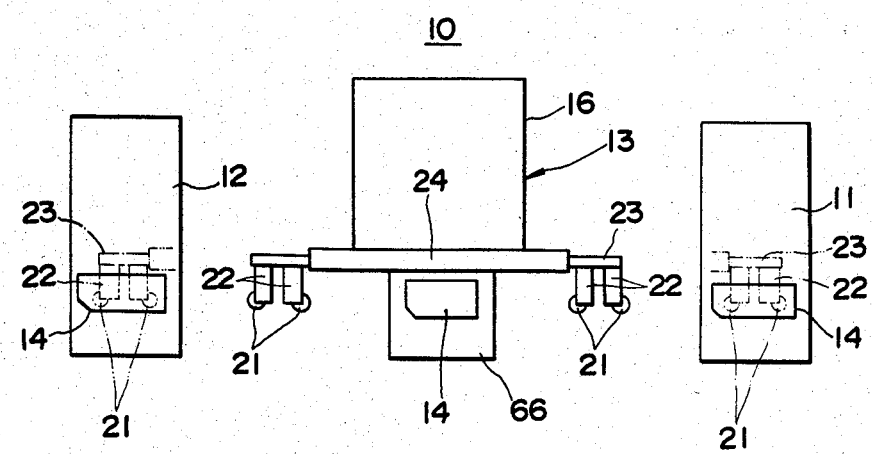
FIG. 1 is a plan view of an automatic delivery apparatus provided in accordance with the present invention.

FIG. 1 shows a processing apparatus 10 which comprises a pair of presses 11 and 12, and an automatic delivery apparatus 13 provided in accordance with the present invention. A workpiece 14 is fed to the press 11 and is subjected to a pressing operation by the press 11.

Then, the workpiece 14 is an automatically delivered to the press 12 by the automatic delivery apparatus 13 so that the workpiece 14 is subjected to a secondary pressing operation by the press 12.

Referring to FIGS. 2 to 4, the automatic delivery apparatus 13 comprises a body 16 supported on a floor by four bolts 15 secured to the bottom of the body 16. An electric motor 17 is mounted on the bottom of the box 16. The output of the motor 17 is transmitted to a shaft 20 through a speed reducer 18 and a pneumatic clutch brake 19.

The rotation of the shaft 20 is transmitted to workpiece holders on the upper portion of the front of the body 16 through cam mechanisms and a displacement transmitting mechanism both of which are accommodated within the body 16, as will hereinafter more fully be described. In the illustrated embodiment, each workpiece holder comprises a pair of suction pads 21 connected to a vacuum source, but it may comprises a magnet or a chuck. The pair of pads 21 are secured to one ends of arms 22, respectively. The other ends of the arms 22 are secured to a horizontally-slidable slide bar 23. The two workpiece holders are secured to the opposite ends of the slide bar 23, respectively. The slide bar 23 is supported by a support member 24 which is engaged in a guide member 25 mounted on the upper portion of the front of the body 16, so that the support member 24 is vertically movable together with the slide bar 23.

A swinging lever 26 is secured at its one end to the center of the slide bar 23, the swinging lever 26 transmits the horizontal movement to the slide bar 23 but does not transmit the vertical movement thereto. The other end of the swinging lever 26 is pivotally connected by a pin to a vertically-disposed guide frame 27 mounted on the body 16 above the pneumatic clutch brake 19. When the swinging lever 26 is swung in opposite directions, the other end is vertically moved along the guide frame 27. Another swinging lever 29 is pivotally connected at its one end to the center of the swinging lever 26 by a pin 28. The other end of the swinging lever 29 is secured to a shaft 30 which is disposed beneath the guide member 25 and is rotatable alternately in opposite directions. The swinging lever 29 is swung in right and left directions (FIG. 2) about the pin 30 when the pin 30 is rotated in the opposite directions.

The shaft 30 is connected to one end of a cam lever 35 through a horizontal displacement transmission mechanism 34 which comprises a lever 31', an upper rod end 31, an extensible rod 32 and a lower rod end 33. The lower rod end 33 is pivotally connected to the cam lever 35 by a connecting bolt 36. A set screw 37 extends into the connecting bolt 36. When the set screw 37 is rotated, the lower rod end 33 is moved inwardly relative to the cam lever 35 together with the connecting bolt 36 so that the amount or stroke of the horizontal movement of the slide bar 23 is adjusted.

The cam lever 35 follows a cam 38 and pivotally moved about a shaft 39. The displacement of the cam surface of the cam 38 is sensed by a roller 40. In this embodiment, an auxiliary cam 41 is fixed relative to the cam 38 so that the cam lever 35 follows accurately the cam 38 at a high speed. A cam lever 42 follows the auxiliary cam 41. The cam lever 42 is pivotally mounted on the shaft 39 on which the cam lever 35 is mounted, the cam lever 42 being disposed in opposed relation to the cam lever 35. The displacement of the cam surface of the auxiliary cam 41 is sensed by a roller 43. A belleville spring 44 is interposed between the cam lever 35 and the cam lever 42 in compressed condition so that their respective rollers 40 and 43 are urged against the cam 38 and 41. Thus, in this embodiment, the cam levers 35, 42, the rollers 40, 43 and the belleville spring 44 constitute a cam mechanism for controlling the horizontal movement of the workpiece holders.

A swinging lever 46 is pivotally connected at its one end to the rear of the support member 24 supporting the slide bar 23. The swinging lever 46 is mounted at the other end on a shaft 47, and when the swinging lever 46 is swung generally vertically about the shaft 47, the support member 24 is vertically moved through the guide member 25. The swinging lever 46 is connected to a cam lever 52 through a vertical displacement transmitting mechanism 51 which comprises an upper rod end 48, an extensible rod 49 and a lower rod end 50. The lower rod end 50 is connected to the cam lever 52 by a connecting bolt 53 into which a set screw 54 extends. The set screw 54 is rotated in so that the distance between the end of the lower rod end 50 mounted on the connecting bolt 53 and a shaft 56 is adjusted for adjusting the amount or stroke of the vertical movement of the slide bar 23.

The cam lever 52 follows a cam 55 and swung generally vertically about the shaft 56. The displacement of the cam surface of the cam 55 is sensed by a roller 57. In this embodiment, a coil tension spring 58 acts between the end of the cam lever 52 remote from the connecting bolt 53 and the upper portion of the internal wall of the body 16 so that the cam lever 52 is urged in a direction to cause the roller 57 to be pressed against the cam surface of the cam 55. Thus, the cam lever 52, the roller 57 and the coil spring 58 constitute a cam mechanism for controlling the vertical movement of the workpiece holders.

The cam 38, the auxiliary cam 41 and the cam 55 are fixedly mounted on a common cam shaft 60 in spaced relation. A pin 61 extends through these three cams 38, 41 and 55 to prevent them from being displaced relative to one another. A sprocket 62 is mounted on one end of the cam shaft 60. A sprocket 63 is mounted on the shaft 20. A chain 64 extends around the two sprockets 62 and 63. A tension sprocket 65 is mounted on the body 16 for horizontal movement so that a proper tension is imparted to the chain 64 by adjusting the tension sprocket 65.

As described above, the cams 38, 41 and 55 are mounted on the common cam shaft 60, and the cam lever 52 and the cam lever 35 are generally diametrically opposed relative to the cam shaft 60. Thus, the automatic delivery apparatus 13 makes effective use of the space in the body 16 and therefore is compact in construction.

Figure 5:
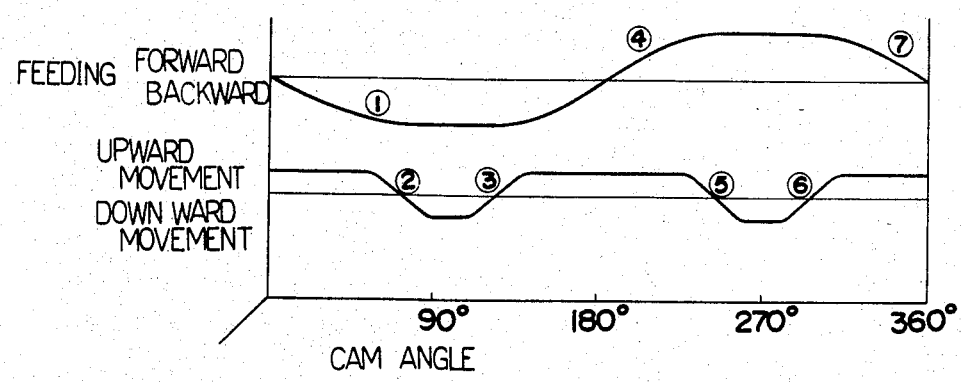
FIG. 5 is a diagram showing the operation of cams.

The operation of the automatic delivery apparatus will now be described with reference to FIG. 5. The apparatus 13 is shown in its neutral position in FIGS. 1 to 4. When the motor 17 is energized to rotate the cams 38, 41 and 55, the roller 40 for the cam 38 and the roller 43 for the auxiliary cam 41 are displaced whereas the roller 57 for the cam 55 remains stationary for a while. More specifically, the roller 40 is displaced in a direction away from the cam shaft 60, and the roller 43 is displaced in a direction toward the cam shaft 60. Therefore, the cam lever 35 and the auxiliary cam lever 42 are rotated about the shaft 39 in a clockwise direction to pull the rod 32 downwardly. Each of the cam levers 35 and 42 is rotated without interfering the rotation of the other. Therefore, the belleville spring 44 always urges the rollers 40, 43 against the cam surfaces under a proper load.

When the rod 32 is pulled downwardly upon the clockwise rotation of the cam lever 35 about the shaft 39, the lever 31' is rotated about the shaft 30 in a clockwise direction. As a result, the swinging lever 29, connected to the shaft 30 to which the cam lever 31' is fixedly mounted, is swung about the shaft 30 in a clockwise direction (FIG. 2), so that the swinging lever 26, pivotally connected to the end of the swinging lever 29 through the pin 28, is swung about its lower end together with the swinging lever 29 in a counterclockwise direction (FIG. 2) with the lower end of the lever 26 slidingly moving along the guide frame 27.

Upon the swinging movement of the swinging lever 26, the slide bar 23 is moved in a left-hand direction (FIG. 2) to a limit position shown in a broken line in FIG. 1. The movement of the slide bar 23 from its neutral to limit position is effected within a cam angle of 90° shown in FIG. 5.

The slide bar 23 is held in its limit position so long as the roller 40 are held against the smooth portion of the cam surface of the cam 38 other than its undulation.

While the slide bar 23 reaches its limit position, the roller 57 is displaced due to the undulation of the cam surface of the cam 55. This displacement takes place within a cam angle of 90° in FIG. 5. First, the cam lever 52 is rotated about the shaft 56 in a counterclockwise direction to pull the rod 49. As a result, the swinging lever 46 is rotated about the shaft 47 in a clockwise direction so that the support member 24 supporting the slide bar 23 is moved downwardly through the guide member 25 to cause the suction pads 21 to hold the workpiece 14 on the press 11.

Then, the support member 24 lowered to its limit position begins to move upwardly when the cam angle exceeds 90°. Then, the workpieces 14 held by the suction pads is placed on a receptacle member 66. Then, the left-hand suction pads 21 hold the workpiece 14 on the receptacle member 66 by suction and deliver it to the press 12. The speed of the downward movement of the slide bar 23 and the speed of the downward movement immediately before the upward movement thereof can be varied in any way depending on the selected configuration of the cam surface at the cam angle of around 90°.

Thus, the vertical movement of the slide bar 23 is carried out at the cam angles of around 90° and 270°. The horizontal movement of the slide bar 23 is carried at the cam angles of between 0° to 180° and between 180° to 360° due to the undulations of the cam surface of the cam 38.

As described above, the horizontal and vertical movements of the workpiece holders are carried out in a smooth and continuous manner by viture of the provisions of the cams 38 and 41 which are both mounted on the common cam shaft 60. In addition, the horizontal and vertical movements are carried out through the common cam shaft 60, and therefore the sequential movements overlap each other at small portions thereof so that these movements are carried out smoothly. Therefore, the automatic delivery apparatus 13 can deliver the workpiece at a high speed in a more stable manner as compared with the conventional delivery apparatuses in which each movement is carried out by a respective individual drive means such as a motor and a pneumatic cylinder.

Further, the lower rod end 33 of the horizontal displacement transmitting mechanism 34 can be moved horizontally relative to the cam lever 35 so as to vary the angle of rotation of the shaft 30 secured to the swinging lever 29, thereby varying the amount of the horizontal movement of the slide bar 23.

Further, the lower rod end 50 of the vertical displacement transmitting mechanism 51 can be moved toward and away from the shaft 56 for the cam lever 52 by the set screw 54 so as to adjust the amount of the vertical movement of the support member 24.

What is claimed is:

1. An apparatus for automatically delivering a workpiece which comprises:
   (a) a body;
   (b) a horizontally-disposed support member mounted on said body for vertical movement;
   (c) a horizontally-disposed slide bar supported by said support member for horizontal movement therealong, said slide bar having a pair of workpiece holders at its opposite ends;
   (d) first cams and a second cam mounted on a common cam shaft and having their respective cam surfaces, said first cams consisting of a cam 38 and an auxiliary cam 41;
   (e) first and second cam mechanisms operable respectively in response to said cam surface of said first and second cams, said first cam mechanism including cam levers 35 and 42, rollers 40 and 43 and a belleville spring 44, and said second cam mechanism including a cam lever 52, a roller 57 and a coil spring 58;
   (f) a first displacement transmitting mechanism operatively connecting said first cam mechanism to said slide bar for displacing said slide bar horizontally, said first displacement transmitting mechanism including a lever 31', an upper rod end 31, an extensible rod 32 and a lower rod end 33;
   (g) a second displacement transmitting mechanism operatively connecting said second cam mechanism to said support member for displacing said support member vertically, said second displacement transmitting mechanism including an upper rod end 48, an extensible rod 49 and a lower rod end 50;
   (h) a motor having an output shaft connected to said cam shaft for rotating said first and second cams; and
   (i) said cam surfaces of said first and second cams having such configurations that upon one revolution of said cam shaft, said slide bar and said support member are moved horizontally and vertically, respectively, in a sequential manner, thereby moving the workpiece in a predetermined manner.

2. An apparatus according to claim 1, in which the amount of the horizontal movement of said slide bar and the amount of the vertical movement of said support member are varied respectively by adjusting said first and second displacement transmitting mechanisms.

3. An apparatus according to claim 1, wherein said first displacement transmitting mechanism comprises a swing lever affixed to a center of the slide bar and is adapted to move the slide bar horizontally in a manner so that the first workpiece holder and the second workpiece holder reciprocatingly move to a common center position.

* * * * *